UNITED STATES PATENT OFFICE.

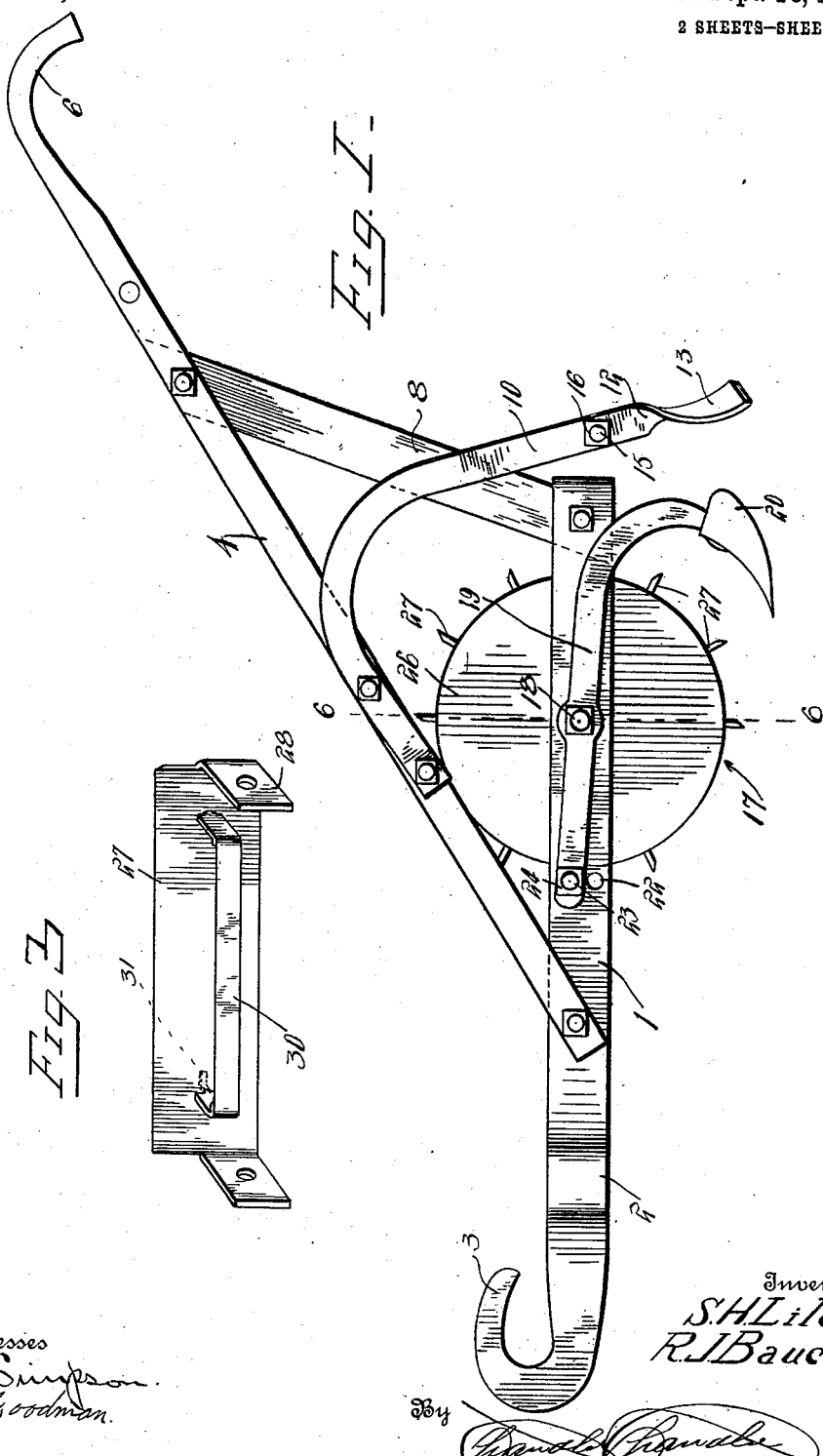

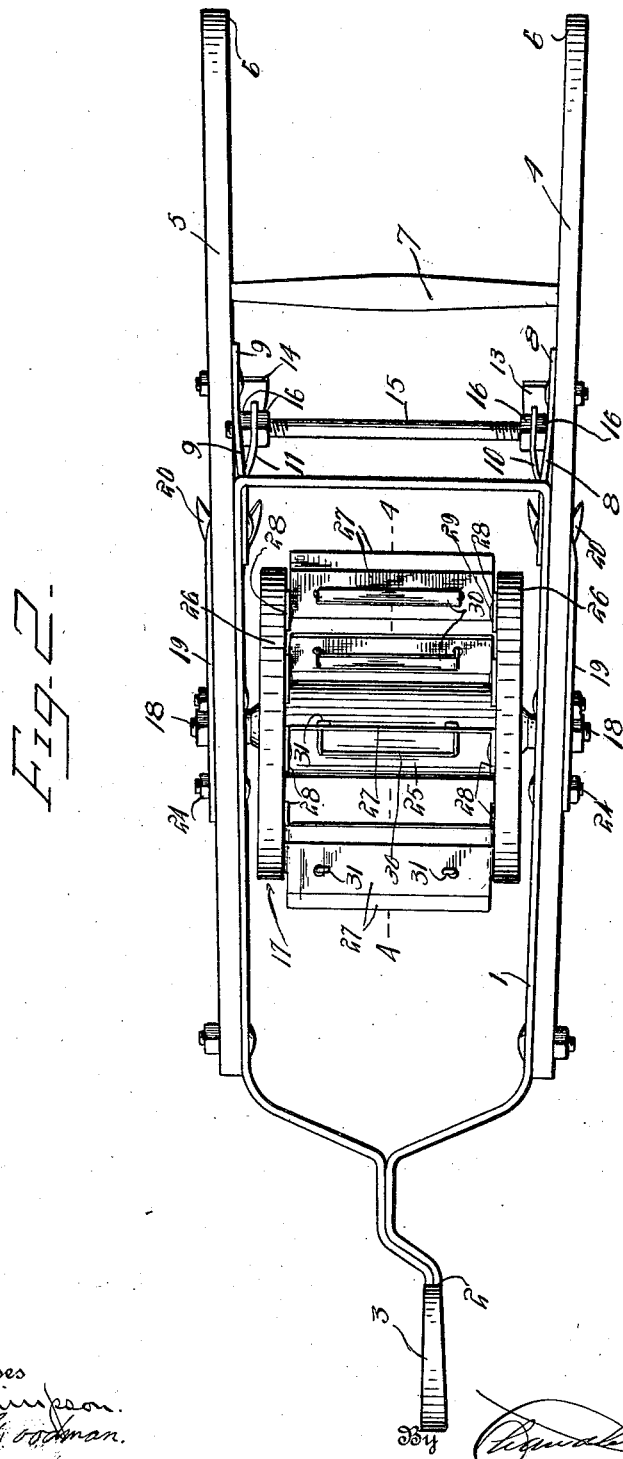

SOLOMAN HIRAM LILES AND RANSOM JOSHUA BAUCOM, OF RAEFORD, NORTH CAROLINA.

COTTON-CHOPPER.

1,073,355.  Specification of Letters Patent.  Patented Sept. 16, 1913.

Application filed June 13, 1911. Serial No. 632,874.

*To all whom it may concern:*

Be it known that we, SOLOMAN HIRAM LILES and RANSOM J. BAUCOM, citizens of the United States, residing at Raeford, in the county of Hoke, State of North Carolina, have invented certain new and useful Improvements in Cotton-Choppers; and we do hereby declare the following to be a full, clear, and exact description of the invention, such as will enable others skilled in the art to which it appertains to make and use the same.

Our invention relates to new and useful improvements in cotton choppers and more especially to that type adapted for use in thinning out young and growing plants, and the object of our invention is to improve the construction and increase the efficiency of choppers of the above type.

A further object of our invention is to provide a cotton chopper adapted to be run along a row of cotton plants and to chop down and destroy a portion of the plants, the chopping wheel being so arranged as to skip certain of the plants at predetermined intervals.

A further object of our invention is to provide adjustable cultivators adapted to throw the earth around the plants so left. And a still further object of our invention is to provide spring cultivator teeth adapted to further bank the earth so thrown.

With these and other objects in view, our invention will be more fully described, illustrated in the drawings which show a preferred embodiment of our improved cotton chopper and then specifically pointed out in the claim which is attached to and forms a part of this application.

In the accompanying drawings, Figure 1 is a side elevation of a cotton chopper. Fig. 2 is a top plan view. Fig. 3 is a detail perspective of one of the chopping blades.

Referring more specifically to the drawings in which similar reference numerals designate corresponding parts throughout, 1 indicates the main frame of our device which is formed of any preferred material preferably metal, and which as shown is substantially rectangular in shape and provided at its forward end with an offset extension 2 terminating in a suitable form of draft hook 3 whereby the animal attached thereto will be positioned at one side and in advance of the chopper and will thus pass between the rows to be operated upon.

Conventional handle members 4 and 5 are secured at their lower ends to the forward portion of the side members of the frame 1 and as shown these handle members extend upwardly and rearwardly and terminate in grips 6 adapted to be grasped by the operator. A brace rod 7 connects the two handles intermediate their length and serves to maintain them in proper position with respect to each other, while substantially vertical braces 8 and 9 connect the handles with the rear portions of the sides of the frame thus rigidly securing the handles to the frame.

Secured by one end to the outer face of each of the handle members are spring metal strips 10 and 11 which as shown are curved downwardly and rearwardly and are twisted adjacent their lower ends as at 12 to form spring cultivator teeth 13 and 14. A tie bolt 15 is passed through these strips at a point slightly above the cultivator teeth and secured in place by means of nuts 16 whereby the teeth are braced and adjustable to proper spaced relation.

The chopping wheel which as a whole is designated by the numeral 17 is rotatably mounted between the side members of the frame upon a shaft 18 the ends of which extend through the side members of the frame and through the arms 19 of the shovel cultivator blades 20 which as shown, are positioned immediately to the rear and adjacent each side of the chopper wheel. This shaft passes through the cultivator carrying arm at a point intermediate its length, and the free end of each of said arms is provided with a perforation adapted to register with any one of a series of similar perforations 22 formed in the side members of the frame and to be maintained in position by means of bolts 23 passed through the perforations of the arms and frame members and secured in place by nuts 24. By this means the shovel cultivators may be readily adjusted to cut the earth at any desired depth as will be readily understood.

Referring more specifically to the chopper wheel which has, as a whole been designated by the numeral 17, it will be seen to consist of a cylindrical hub member 25 which is rotatably mounted upon the shaft and upon either end of which is secured a bearing wheel 26. Connecting the peripheral edges of said wheels and extending radially with respect to the hub are a plurality of removable knives or blades 27, and as shown these blades each extend a slight distance beyond the peripheries of the wheels and are positioned in spaced apart groups whereby a portion of the plants in the row will be left standing, said standing plants being left at predetermined distances from each other which distances may be readily altered as desired by the removal or addition of the blades, as will be readily understood. As best shown in Fig. 3 of the drawings each of these blades are provided at each end with laterally extending lugs 28 adapted to receive screws 29 by means of which the blades are secured to the inner faces of the bearing wheels. This construction renders them readily detachable for altering the spacing between the plants left standing. Secured to the rear face of each of the cutting blades is an auxiliary cutting blade 30 which as shown is substantially U-shaped, the free ends of said auxiliary blade terminating in right-angled extensions provided with tongues 31 adapted to be passed through suitable openings formed in the blades proper and to be then bent over as best shown in Fig. 5 of the drawings. By this means the auxiliary blades are secured to the blades proper in such a manner as to extend in parallel spaced relation thereto with their cutting edges approximately in alinement with the peripheral edges of the bearing wheels. These auxiliary blades assist the blades proper in bending over the young plants to be cut and also insure the cutting of the plants.

In operation a suitable draft animal is attached to the chopper which is then drawn along the row to be operated upon with one of the bearing wheels resting upon each side of the row. The revolving of the chopper wheel as will be readily understood cuts out the majority of the plants as desired leaving the remainder in spaced groups. The shovel blade cultivators then throw the earth against the sides of the plant and the spring teeth cultivators following behind break up the earth and effectually bank it against the plants. By this means the cotton is thinned, cultivated and hilled up in one operation with a single machine.

What we claim is:—

A cotton chopper providing a substantially rectangular frame, handles secured to the side members of said frame, and braced thereon, spring metal strips secured at one end to the outer faces of said handles, said spring strips being curved rearwardly and downwardly and twisted adjacent their lower ends to form cultivator teeth, and a tie bolt passing through said strips near the lower ends thereof, said bolt provided with nuts whereby said teeth may be braced and adjusted in spaced relation to each other.

In testimony whereof, we affix our signatures, in presence of two witnesses.

SOLOMAN HIRAM LILES.
RANSOM JOSHUA BAUCOM.

Witnesses:
 JNO. W. MOORE,
 W. T. CRUMP.

---

Copies of this patent may be obtained for five cents each, by addressing the "Commissioner of Patents, Washington, D. C."